US009807453B2

(12) United States Patent
Wang et al.

(10) Patent No.: US 9,807,453 B2
(45) Date of Patent: Oct. 31, 2017

(54) MOBILE SEARCH-READY SMART DISPLAY TECHNOLOGY UTILIZING OPTIMIZED CONTENT FINGERPRINT CODING AND DELIVERY

(71) Applicant: TCL RESEARCH AMERICA INC., San Jose, CA (US)

(72) Inventors: Haohong Wang, San Jose, CA (US); Zhi Zhang, San Jose, CA (US); Guanghan Ning, San Jose, CA (US); Xiaobo Ren, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 5 days.

(21) Appl. No.: 14/984,668

(22) Filed: Dec. 30, 2015

(65) Prior Publication Data

US 2017/0195717 A1   Jul. 6, 2017

(51) Int. Cl.
| | |
|---|---|
| H04H 60/32 | (2008.01) |
| H04N 21/44 | (2011.01) |
| H04N 21/41 | (2011.01) |
| H04N 21/4223 | (2011.01) |
| H04N 21/81 | (2011.01) |
| H04N 21/439 | (2011.01) |
| H04N 21/6379 | (2011.01) |
| G06F 17/30 | (2006.01) |

(52) U.S. Cl.
CPC . *H04N 21/44008* (2013.01); *G06F 17/30784* (2013.01); *H04N 21/4126* (2013.01); *H04N 21/4223* (2013.01); *H04N 21/4394* (2013.01); *H04N 21/6379* (2013.01); *H04N 21/8133* (2013.01)

(58) Field of Classification Search
CPC .................. H04N 21/4122; H04N 21/4316
USPC .......................................................... 725/19
See application file for complete search history.

(56) References Cited

U.S. PATENT DOCUMENTS

| | | | | |
|---|---|---|---|---|
| 2007/0005795 A1* | 1/2007 | Gonzalez | .......... | G06F 17/30017 709/232 |
| 2013/0163957 A1* | 6/2013 | Ikizyan | .............. | G06K 9/00751 386/241 |

\* cited by examiner

*Primary Examiner* — Jivka Rabovianski
(74) *Attorney, Agent, or Firm* — Anova Law Group, PLLC

(57) ABSTRACT

A method for a mobile search-ready smart display system containing a smart display having a screen and at least one mobile device having a camera including extracting a plurality of video fingerprints from an ongoing content displayed on the screen. The ongoing content has video frames corresponding to the video fingerprints; determining one or more representative video fingerprints of the video frames from the plurality of video fingerprints; generating one or more encoded representative video fingerprints through encoding the one or more representative video fingerprints into a pixel translucency change; and delivering the one or more encoded representative video fingerprints via a screen-camera communication. The method also includes optimizing the encoding of the one or more representative video fingerprints and the delivering of the one or more encoded representative video fingerprints to find a balance between an error resilience and transmission time.

20 Claims, 3 Drawing Sheets

MOBILE SEARCH-READY SMART DISPLAY TECHNOLOGY UTILIZING OPTIMIZED CONTENT FINGERPRINT CODING AND DELIVERY

FIELD OF THE INVENTION

The present invention relates generally to the field of information technologies and, more particularly, to mobile search-ready smart display technology utilizing optimized content fingerprint coding and delivery.

BACKGROUND

Nowadays, powerful search engines dominate the ways people acquire information, and are becoming more and more popular in searching for rich content. Compared with searching for plain text, a retrieval of rich content media requires new technologies to describe, organize, and manage data in various types of formats. Automatic Content Retrieval (ACR) has been proven a very effective method to search for rich content. Existing ACR systems are effective in certain situations and many value-added services have been derived from the ACR systems.

Thus, it is a promising business to allow users to enjoy value-added services through using their mobile devices, such as smartphones, tables, or even smart watches, to retrieve abundant information about the content sources. An emerging mobile search-ready technology may enable users to use their mobile devices to secure value-added services based on the retrieval of media information, such as pictures on posters, videos on public bulletins, and audios in media players, etc.

Mobile devices may retrieve media information from a smart terminal. For example, a smart display, such as a public bulletin display or a home TV display, usually faces multiple users in front. Considering a scenario where the smart display is interfacing with multiple mobile devices and the number of displays may vary all the time, a 2-way communication channel may not be efficient, and a 1-way communication channel from the smart display to the mobile devices, such as a 1-way broadcasting channel, may be more appropriate. Then, the mobile devices may receive signals from the smart display and then use the signals for mobile search to obtain the value-added services.

However, according to the present disclosure, there are some concerns in the 1-way communication from the smart display to the mobile devices. For example, the mobile devices may listen to the sounds of the smart display and use ACR for the audio based retrieval, but this approach does not work very well for multiple users if a surrounding noise level, e.g., chatting, music and etc., is above a certain threshold. In addition, a user may take a photo of the smart display screen for ACR, and the ACR results are affected by noises such as light reflections, color changes, etc. Thus, video based retrieval or audio-video based retrieval may achieve a better result.

However, in a video retrieval application, efficiently utilizing a transmission channel capacity and finding a balance between an error resilience and a transmission time may be highly desired. The disclosed methods and systems are directed to solve one or more problems set forth above and other problems.

BRIEF SUMMARY OF THE DISCLOSURE

One aspect of the present disclosure includes a method for a mobile search-ready smart display system containing a smart display having a screen and at least one mobile device having a camera. The method includes extracting a plurality of video fingerprints from an ongoing content displayed on the screen. The ongoing content has video frames corresponding to the video fingerprints. The method includes: determining one or more representative video fingerprints of the video frames from the plurality of video fingerprints; generating one or more encoded representative video fingerprints through encoding the one or more representative video fingerprints into a pixel translucency change; and delivering the one or more encoded representative video fingerprints via a screen-camera communication. The method also includes optimizing the encoding of the one or more representative video fingerprints and the delivering of the one or more encoded representative video fingerprints to find a balance between an error resilience and transmission time.

Another aspect of the present disclosure includes non-transitory computer-readable medium having computer program for, when being executed by a processor, performing a content retrieval method. The method includes extracting a plurality of video fingerprints from an ongoing content displayed on the screen. The ongoing content has video frames corresponding to the video fingerprints. The method includes: determining one or more representative video fingerprints of the video frames from the plurality of video fingerprints; generating one or more encoded representative video fingerprints through encoding the one or more representative video fingerprints into a pixel translucency change; and delivering the one or more encoded representative video fingerprints via a screen-camera communication. The method also includes optimizing the encoding of the one or more representative video fingerprints and the delivering of the one or more encoded representative video fingerprints to find a balance between an error resilience and transmission time.

Another aspect of the present disclosure includes a method for a mobile device having a camera. The method includes receiving one or more encoded representative video fingerprints of a video frame delivered via a screen-camera communication via a screen-camera communication; decoding the one or more encoded representative video fingerprints to normal video fingerprints; and searching for a matching video having video frames corresponding to the normal video fingerprints in a content database; and returning searching results to a user. The one or more encoded representative video fingerprints of the video frame are generated by encoding one or more representative video fingerprints of the video frame into a pixel translucency change, and the one or more representative video fingerprints are selected from a plurality of video fingerprints extracted from an ongoing content displayed on a screen of a smart display. The encoding of the representative fingerprints and the delivering of the encoded representative video fingerprints are optimized to find a balance between an error resilience and transmission time.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

A group of users may search multimedia contents using their mobile devices. For example, the group of users is trying to use their smartphones to get related information of a drama or advertisement from a smart display while the environmental noise is significant. In such a circumstance, audio retrievals may not be reliable, while video retrievals or audio-video retrievals may achieve a better result.

In the disclosed embodiments, a content in the smart display can be retrieved through video fingerprint techniques or video fingerprint techniques combined with audio fingerprint techniques. To create a reliable content (e.g., video) retrieval system, the content retrieval may need to be made possible by making use of either audio or visual information. For audio retrieval, the first step may involve isolating a sequence of "feature" in the piece of audio. This set of feature may be referred as a "fingerprint" of the audio sequence.

The concept of fingerprint, when used in audio retrieval systems, is the function to map an audio object that consists a large number of bits to a limited number of bits which could be called fingerprint. The fingerprint needs to be sufficiently distinguishable, so that two fingerprints can be reliably separated from each other or regarded similar to each other.

For video retrieval, a single frame from a video sequence may be discriminable enough to be searched in a large dataset. This enables each frame itself being an independent unit, regardless of what inter-frame information is. Thus, proper frames or representative frames may be used instead of collecting all of the continuous frames for database search, redundant inter-frame information may be unnecessary.

The term "video fingerprinting" may refer to a technique in which software identifies, extracts, and then compresses characteristic components of a video, enabling that video to be uniquely identified by its resultant "fingerprint". Such technique may include key frame analysis, color and motion changes sequential analysis, feature and object analysis, camera shot analysis, etc., and the analysis results may then be used as the fingerprints of the video sequence.

Figure 1:
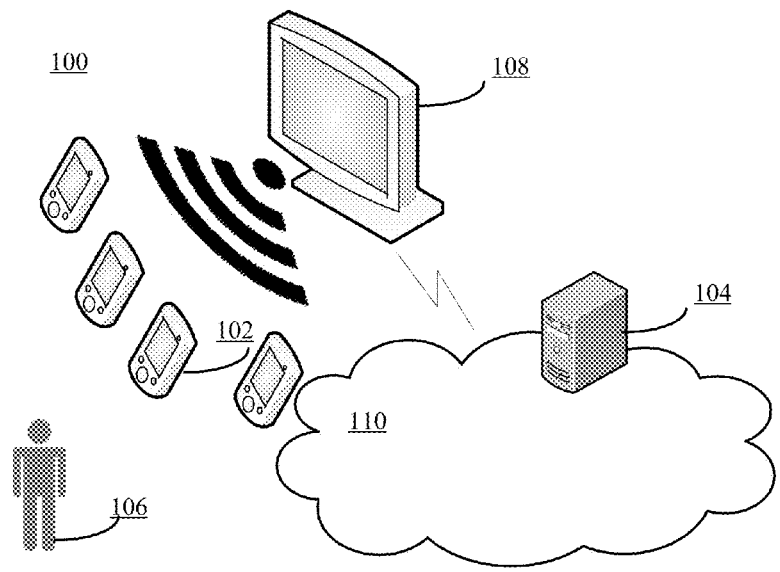
FIG. 1 illustrates an exemplary video retrieval system consistent with disclosed embodiments.

FIG. 1 illustrates an exemplary video retrieval system consistent with the disclosed embodiments. As shown in FIG. 1, the video retrieval system 100 may include a smart terminal 108, a user terminal 102, a server 104, a user 106, and a network 110. Other devices may also be included. The smart terminal 108 may include any appropriate type of smart terminals having a display (i.e. screen), such as a smart TV, smartphones, tablets, PCs, and smartwatches, etc. Further, the smart terminal 108 may be any smart content-presentation device capable of presenting multiple programs in one or more channels, which may be controlled through a remote control (not shown). The smart terminal may be illustrated by a representative smart display in the following descriptions. In certain embodiments, the smart display is a smart TV, a public bulletin display, or any other big-screen display device.

The user terminal 102 may include any appropriate type of mobile computing devices, such as a tablet, a mobile computer, a smartphone, and etc. The user terminal 102 may have an internal camera or an external camera connected to the user terminal 102 over the network 110. The user terminal 102 may be illustrated by a representative mobile device in the following descriptions.

The server 104 may include any appropriate type of server computer or a plurality of server computers for providing personalized contents to the user 106. The server 104 may also facilitate the communication, data storage, and data processing among the other servers, the smart terminal 108 and the user terminal 102.

Although four user terminals 102, one smart terminal 108 and one server 104 are shown in FIG. 1, any number of user terminal 102 and/or smart terminals 108 and/or server 104 server may be included. The smart terminal 108, the user terminal 102 and the server 104 may communicate with each other through one or more communication networks 110, such as cable network, phone network, and/or satellite network, etc.

The user 106 may be a single user or a plurality of users, such as family members. The user 106 may interact with the smart terminal 108 and/or the user terminal 102 to query and to retrieve various contents or watch programs and perform other activities of interest.

Figure 2:
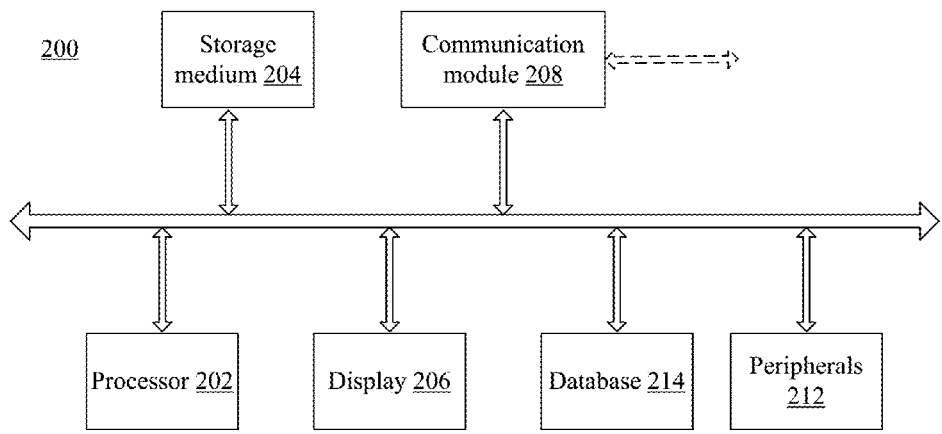
FIG. 2 illustrates an exemplary computing system consistent with disclosed embodiments.

The smart terminal 108, the user terminal 102 and/or the server 104 may be implemented on any appropriate computing circuitry platform. FIG. 2 shows a block diagram of an exemplary computing system consistent with disclosed embodiments capable of implementing a smart display, mobile device, and/or server.

As shown in FIG. 2, the computing system 200 may include a processor 202, a storage medium 204, a display 206, a communication module 208, a database 214, and peripherals 212. Certain components may be omitted and other components may be included.

The processor 202 may include any appropriate processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by processor 202.

Further, the peripherals 212 may include various sensors and other I/O devices, such as keyboard and mouse, and the communication module 208 may include certain network interface devices for establishing connections through communication networks. The database 214 may include one or more databases for storing certain data and for performing certain operations on the stored data, such as database searching.

Returning to FIG. 1, the smart display 108 may simultaneously broadcast fingerprints to multiple mobile devices 102 in real time, based on a display broadcasting technique called screen-camera communication. That is, a display, considered as a transmitter, is able to utilize an alpha channel to encode bits into pixel translucency change. Thus, a camera-equipped device (such as a mobile device) can get the data through turning the camera to the display screen and decoding the data based on the computational alpha channel fluctuation hidden in pixel values. Researchers have adopted spatial and temporal low-pass properties of human vision system, and successfully encoded data which may only be captured and decoded by cameras.

The screen-camera communication technique may enable the smart display 108 to broadcast information to multiple mobile devices 102 simultaneously. For example, the smart display 108 may broadcast information via operating on an invisible light spectrum band. That is, the broadcasted information may be invisible to the user. The smart display 108 may also broadcast information via operating on a visible light spectrum band, which can be viewed by the user of the mobile devices as well. Further, the smart display 108 may broadcast information as part of the contents displayed by the smart display 108, or the smart display 108 may broadcast information as a separate content just for the broadcasting. This unobtrusive technology may offer a promising out-of-band communication alternative to short-range information acquisition, which may be appropriate for broadcasting information to multiple devices.

Then the mobile devices 102 may use the received fingerprints to acquire related information from powerful search engines, as well as access value-added contents and services. Thus, the smart display 108 is named as a mobile search-ready smart display and the video retrieval system 100 named as a mobile search-ready smart display system.

In certain embodiments, the smart display 108 may not be connected to the networks. For example, the smart display 108 may take a local video from a local Blu-ray player as an input, extract video fingerprints from the ongoing local video and then broadcast the video fingerprints via the screen-camera communication to the mobile device 102. This feature may enable various applications for the mobile search-ready smart display in a wider field.

Figure 3:
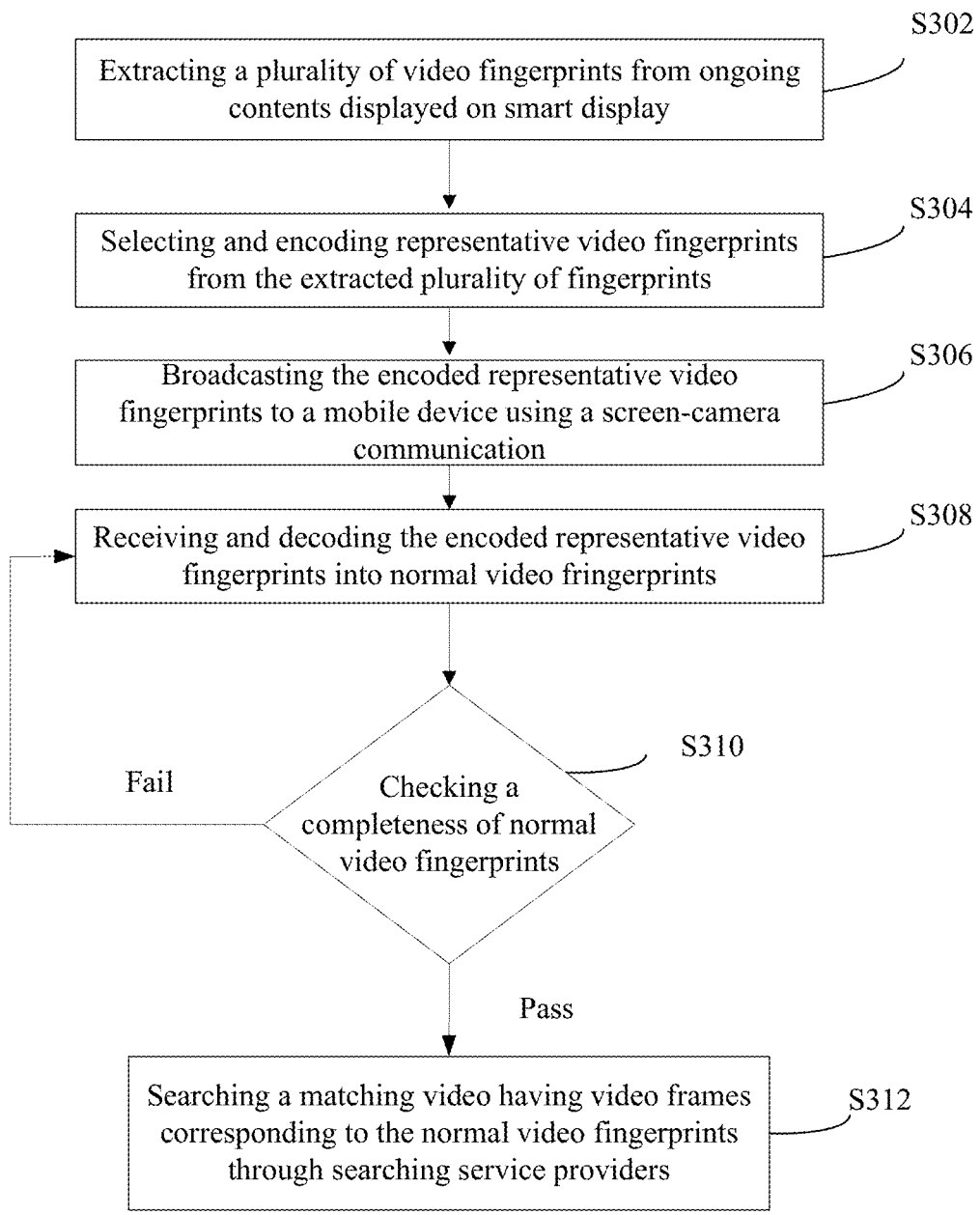
FIG. 3 illustrates an exemplary process performed by an exemplary video retrieval system consistent with disclosed embodiments.

FIG. 3 illustrates an exemplary process performed by an exemplary video retrieval system consistent with the disclosed embodiments. As shown in FIG. 3, at the beginning, fingerprints of ongoing contents (i.e. a video stream) displayed on a smart display are extracted (S302). A video stream may be divided into scenes; a scene may be divided into shots; and a shot may be divided into frames, etc. Because a video is a sequence of frames and the changes between consecutive frames are relatively small due to typical frame rate for a video (e.g., 25 frames/second), instead of dealing with each frame individually, some grouping or clustering techniques may be applied to separate the whole video into different sets of frames with each set has similar frames for further processing.

A predetermined feature extraction algorithm may be used to extract the fingerprints of the video frame displayed on the smart display, i.e., features of the video frame representing the characteristic information of the video frame and identifying the video frame. Generally, each fingerprint may correspond to a certain segment of video.

After the fingerprints of ongoing contents displayed on the smart display are extracted, representative fingerprints are selected and encoded (S304). The representative fingerprints represent the video frame. The smart display may encode data (i.e. representative fingerprints) into a pixel translucency (alpha value) change, and the alpha value change of each pixel may be based on color distribution of the video frames and frame transition. Then the smart display may broadcast the encoded representative fingerprints via a screen-camera communication (S306).

Alpha ($\alpha$) values are blended by the GPU (<1 ms), thus data encoding may be almost instantaneous and a real-time communication may be enabled. The real-time communication may be necessary and important when the ongoing content displayed on the smart display is not known in advance, for example, interactive gaming scene.

A user experience, on one hand, may depend on an accuracy of the retrieval. With sufficiently powerful search engines, the retrieval may achieve an expected accuracy, if the fingerprints used for query are free of noise. Thus, the accuracy of the retrieval may depend on a transmission error rate of the fingerprint via the screen-camera communication channel.

On the other hand, the user experience may be highly related to the time for the mobile device to get the needed information from the search engines. Because in the screen-camera communication, the internal camera or the external camera has to be aligned with the smart display for a certain time, in order for one message to be completely transmitted via the screen-camera communication channel. A normal user may only be willing to hold his mobile device in front of the display for a few seconds. Because the time for querying a certain fingerprint from the search engines is universal, the actual time that may affect the user experience is the time for the mobile device to get the fingerprints from the smart display 108 through the screen-camera communication channel.

In order to improve user experience by reducing the fingerprint transmission error rate, additional bits may be added when the transmitter (i.e. the smart display) encodes the data to increase error resilience. However, the screen-camera communication has a limited channel capacity. That is, given a unit time, the bits of fingerprints that can be transmitted through the screen-camera communication channel is limited. Thus, adding additional bits may reduce the user experience in terms of the transmission time, because it takes more time for the channel to transmit the fingerprints with redundant information, i.e., the fingerprints with additional bits.

In a video retrieval application, efficiently utilizing the channel capacity and finding a balance between the error resilience and the transmission time are highly descried. That is, with a limited channel capacity, sending the most valuable information in a smart way, in order to achieve a maximum video retrieval accuracy.

To achieve a maximum accuracy of retrieving intended contents based on the video fingerprints as well as a desired transmission time through the screen-camera communication channel (i.e. find a balance between the error resilience and the transmission time), the video retrieval system provides the service based on the concept of optimized content fingerprint coding and delivery. That is, optimizing a selection of the content fingerprints and a coding of the content fingerprints by estimating the transmission performance of the screen-camera communication channel as well as combining the expected transmission error with the capacity limitation of the communication channel into an optimization framework.

Suppose the fingerprints are desired to be transmitted and received without any distortion, and this may require a verification overhead, denoted as ∇, to verify the completeness of each fingerprint. It should be noted that the communication from the screen to the camera is simplex, thus re-sending packets in a fingerprint may not be possible because the transmitter (i.e. the smart display) may have no knowledge about the receivers (i.e. the mobile devices).

Because most scenes in a video frame are gradual transitions, a current fingerprint to be transmitted via the screen-camera communication channel is similar to a previous fingerprint to some extent, unless a cut scene occurs in this specific video frame. To avoid a complete loss of the fingerprint during the transmission, each fingerprint may be divided into several packets, thus the lost packets in the current fingerprint may be recovered through copying the corresponding bits from the previous fingerprint, if applicable. It is highly possible that the lost packets in the current fingerprint may successfully get recovered if the sequential fingerprints are similar.

Fewer packets may be required for similar parts between the previous fingerprint and current fingerprint. In fact, a packet overhead Δ may have a fixed size, regardless of the packet's length. Thus, it is important to decide how to divide a fingerprint into packets.

The user may start receiving bits from the screen-camera communication channel at any time, which may not be predicted by the transmitter (i.e. the smart display). An expected probability of a successful transmission is denoted as E(P).

Thus the original optimization problem can be converted to the following formulation:

$$\text{Maximize } E(P), \text{ s. t. } B \leq B_{max} = T*R \quad (1)$$

Where T is the user query tolerance in time. The user may give up acquiring data from the screen as long as the acquiring time is longer than T R is bitrate of communication channel. B is the overall bits used by the fingerprint, which is expressed as:

$$B = F + \Delta * K + \nabla \quad (2)$$

Where F is the fixed size of the fingerprint, K is the number of packets in the fingerprint, ∇ is the packet overhead, and ∇ is the fingerprint checksum overhead. Thus, one problem to solve for the service is to maximize the expected probability of a successful transmission E(P), given limited bits $B_{max}$ used by the fingerprint.

There are two options to maximize E(P), i.e.

$$E(P) = \max \begin{pmatrix} \max[E(P_i)] & \text{s.t. } B_i \leq B_{max} \\ \max[E(P_{i|i-1})] & \text{s.t. } B_i \leq B_{max} - B_{i-1} \end{pmatrix}, \quad (3)$$

$i \in \{\text{candidate set}\}$

Where $E(P_i)$ denotes the expected probability of a successful transmission of the current fingerprint, and $E(P_{i|i-1})$ denotes the expected probability of a successful transmission of the previous fingerprint.

Due to the stochastic scree-camera channel, the distortion at the receiver end may be a random variable. The expected bit error probability is denoted as e, and the probability of a correct bit transmission is denoted as s, where s=1−e.

Assuming each fingerprint is divided into K packets and the original bits of each packet is denoted as $f_k$, where k=1, 2, . . . , K.

Apparently, $f_k$ must satisfy the follow equation:

$$\Sigma_{k=1}^{K} f_k = F \quad (4)$$

And the overall bits of the k-th packet is $f_k' = f_k + \Delta$. Thus the expected probability that packet k is correctly received is $s^{f_k'}$ if the receiving process is considered as a random error-prone channel. Thus $E(P_i)$ can be expressed in the follow equation:

$$E(P_i) = \Pi_{k=1}^{K} s^{f_k'} \quad (5)$$

Assume a more complicated scenario where a previous fingerprint is available, each packet have three receiving status: 1) success, 2) lost but recovered from previous fingerprint, 3) lost and failed from recovering. Thus $E(P_i)$ can be expressed in the follow equation:

$$E(P_{i|i-1}) = E(P_{i-1}) \cdot \prod_{k=1}^{K} [s^{f_k'} + (1 - s^{f_k'}) \cdot M_k] + [1 - E(P_{i-1})] \cdot \prod_{k=1}^{K} s^{f_k'} \quad (6)$$

$$M_k = \begin{cases} 1, \text{ if } FP_i^k = FP_{i-1}^k \\ 0, \text{ otherwise} \end{cases} \quad (7)$$

Where $FP_i^k$ is the sub-string in fingerprint $FP_i$ belonging to the packet k, $FP_{i-i}^k$ is the sub-string in fingerprint $FP_{i-1}$ belonging to the packet k, and $M_k$ is a matching index. If $FP_i^k$ matches $FP_{i-1}^k$ i.e., $FP_i 1^k$ is the same as $FP_{i-1}^k$, $M_k$ has a value of 0. If $FP_i^k$ doesn't match $FP_{i-1}^k$, i.e., $FP_i^k$ is different from $FP_{i-1}^k$, $M_k$ has a value of 1.

Figure 4:
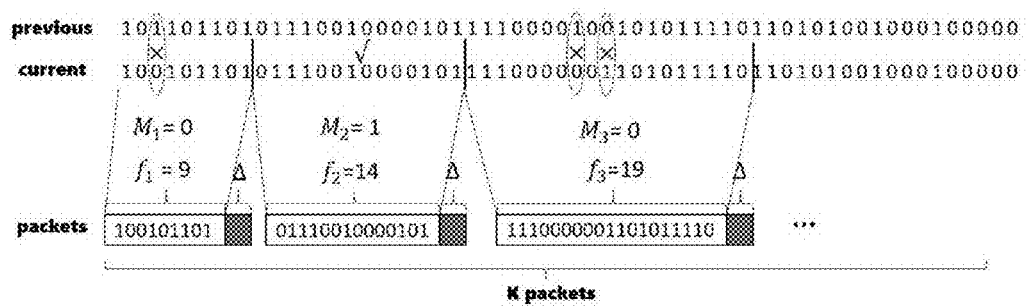
FIG. 4 illustrates an exemplary packet allocation consistent with disclosed embodiments.

FIG. 4 illustrates an exemplary packet allocation consistent with disclosed embodiments. As shown in FIG. 4, the fingerprint may be divided into K packets, in the first packet, the original bits $f_1=9$, and $M_1=0$ because the current first packet is different from the previous first packet. In the second packet, the original bits $f_2=14$, and $M_2=1$ because the current second packet is the same as the previous second packet. In the third packet, the original bits $f_3=19$, and $M_3=0$ because the current third package is different from the previous third packet.

Based on the above discussion, the overall optimization problem can be rewritten as:

$$E(P) = \max \begin{cases} \max\left[\prod_{k=1}^{K} (1-e)^{f_2+\Delta}\right], & \text{s.t. } F + \Delta \cdot K + \nabla \leq B_{max} \\ \max\left\{E(P_{i-1}) \cdot \prod_{k=1}^{K} \left[(1-e)^{f_k+\Delta} + \left(1 - (1-e)^{f_k+\Delta}\right) \cdot M_k\right] + [1 - E(P_{i-1})] \cdot \prod_{k=1}^{K} (1-e)^{f_k+\Delta}\right\}, & \text{s.t. } F + \Delta \cdot K + \nabla \leq B_{max} - B_{i-1} \end{cases} \quad (8)$$

As Eq. (8) indicates, in the optimization process, all variables are fixed except K and $f_k$. That is, the optimization is based on designing a best packet delivery pattern, with or without a similarity measurement between the previous fingerprint and the current fingerprint. Thus, the optimization problem can be converted to a polynomial time dynamic programming solvable problem.

A solution to the optimization problem (8) may be derived using the Lagrange multiplier method to relax the overall bit constraint, so that the relaxed problem can be solved using a shortest path algorithm.

First, a packet division status is denoted by a latent state variable $\phi$, i.e., how many packets are used in the fixed size fingerprint and how the packet size are allocated in the fixed size fingerprint. Once $\phi$, $f_k$ and K are determined, $E(P_i)$, $E(P_{i|i-1})$ and $B_i$ can be determined accordingly. The indirect mapping function can be expressed as:

$$E(P_i) = V^1(\phi) \quad (9)$$

$$E(P_{i|i-1}) = V^2(\phi) \quad (10)$$

$$B_i = U(\phi) \quad (11)$$

Thus the Lagrangian cost function of Eq. (8) can be written into two separated functions, and the final result is the larger one of these two separated functions, which can be denoted as:

$$J_\lambda(\phi) = \max(V^1(\phi) + \lambda \cdot U(\phi), V^2(\phi) + \lambda \cdot (U(\phi) + B_{i-1})) \quad (12)$$

where $\lambda$ is called the Lagrange multiplier. It have been proven that if there is a $\lambda^*$, such that $\phi^* = \mathrm{argmax}_\phi J^*_\lambda(\phi)$, and which leads to $B_i = B_{max}$ or $B_i + B_{i-1} = B_{max}$, then $\phi^*$ is an optimal solution to problem (8). Thus if the optimal solution to $\max[J_\lambda(\phi)]$ can be found, then the optimal solution to the constrained problem of Eq. (8) can be found accordingly.

Figure 5:
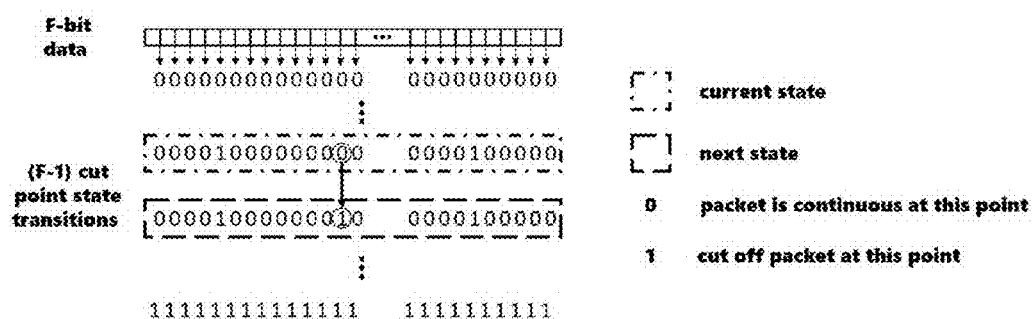
FIG. 5 illustrates an exemplary packet cut state transition consistent with disclosed embodiments.

As discussed above, the state variable $\phi$ indicates the packet division status. FIG. 5 illustrates an exemplary packet cut state transition consistent with disclosed embodiments. As shown in FIG. 5, 0 (number) denotes the packet is continuous at this point, 1 (number) denotes the packet has a cut off at this point. The cutting process is a one-way operation, i.e., a cut point is selected from positions without any previous cuts (marked as 0). The fingerprint is transmitted in one packet. In an initial state, the fingerprint includes F-bit data, and the packet has an all-zero state. In a termination state, the fingerprint includes (F-1)-bit data, and the packet has an all-one state. Thus, starting from the initial state to the termination state, dynamic programming can be used to solve for the optimal solution of problem (8) based on two-dimensional DAG Shortest Path Algorithm.

Under dynamic programming, to solve the optimization problem in (8), a cost function $J_\lambda(\phi)$ may be created. The cost function $J_\lambda(\phi)$ has two independent routes, and the two independent routes are solved separately. Without a loss of generality, the delta cost function is expressed as:

$$\Delta(\phi_{j-1}, \phi_j) = V^{1or2}(\phi_j) - V^{1or2}(\phi_{j-1}) + \lambda \cdot U(\phi_j) - \lambda \cdot U(\phi_{j-1}) \quad (13)$$

which is independent on the selection of the previous states $\phi_0, \phi_1, \ldots, \phi_{j-2}$. Thus, cost function $$J_\lambda(\phi_j) = \max[J_\lambda(\phi_j) + \Delta(\phi_{j-1}, \phi_j)] \quad (14)$$

can be solved in dynamic programming algorithm.

Thus, a desired or maximized probability of a successful transmission of the fingerprint can be determined through the content fingerprint encoding and delivery optimization. The content fingerprint encoding and delivery may be real-time repetitively optimized to find a best tradeoff between the transmission time and the communication reliability.

Further, returning to FIG. 3, after the encoded representative fingerprints are broadcasted, a mobile device receives and decodes the encoded representative fingerprints into normal fingerprints (S308). The received encoded representative fingerprints may include encoded αvalues, screen content, ambient light, and camera noise. Among them, the encoded αvalues may be the desired information that the mobile device aims to extract, and the rest may be interfering sources. The mobile display may decode the received encoded representative fingerprints by predetermined algorithms.

Further, the mobile device may check the completeness of the normal fingerprint before querying cloud servers (S310). If the checksum of the normal fingerprint fails, the mobile device is going back to receive and decode another encoded fingerprint (different from the previously received encoded fingerprint with a failed checksum) until the checksum passes (S308). If the checksum passes, the mobile device searches for a matching video having video frames corresponding to the normal video fingerprints through querying cloud servers, search engines or other searching service providers (S312).

Thus, by using the framework for video retrieval systems with optimal expected probability of a successful transmission given limited bitrate quote, an optimization method is provided to convert the original optimization problem into a polynomial time dynamic programming solvable problem.

The disclosed mobile search-ready smart display systems and methods are based on an important vision that in future media searches through mobile devices will be a nature part of the daily life, thus the mobile search-ready smart display technology will be widely adopted for many new services and applications.

For example, in one embodiment, a user may be interested in a product advertised on a TV in a supermarket. The supermarket is full of shoppers and noises, thus it is difficult for him to listen clearly about the product information played on the TV. The TV may be a mobile-search ready smart TV, which keeps broadcasting encoded representative fingerprints representing the ongoing video content on the TV via a screen-camera communication. The user may turn the camera of his smartphone to the TV to capture some fingerprints broadcasted by the TV. Then the smartphone may decode the fingerprints and search for a matching video on Google. The user may get related product information through watching the matching video, such as where to buy, what is the price, etc. He may further purchase the product by using his smartphone.

In another embodiment, a bus may stop next to a public bulletin board, a person on the bus sees a movie trailer displayed on the public bulletin board and he wants to watch the movie at a theater. However, the bus starts to move again before the name of the movie is revealed. The public bulletin board may incorporate a mobile-search ready smart display, which keeps broadcasting encoded representative fingerprints representing the ongoing video content on the display via a screen-camera communication. By realizing this, the person may turn the camera of his smartphone to the display to capture some fingerprints of the movie trailer. Then the smartphone may decodes the fingerprints and search for a matching video on Google. After watching the matching video, he may get to know the name of the movie and further buy a movie ticket by using his smartphone.

It should be noted that that the mobile search-ready smart display system may adopt any screen-camera communication technologies and any fingerprint-based ACR technologies. The disclosed mobile search-ready smart display system and methods may be considered as general framework that can be used for any scenarios with a display-mobile device communication.

Further, the disclosed mobile search-ready smart display systems and methods may also extend to other devices with displays, such as smartphones, tablets, PCs, smartwatches, and so on, to perform video retrieval and broadcast fingerprints to multiply mobile devices, and mobile devices may use the received fingerprints to search related contents from search service providers and bring value-add services to users. Other steps may be referred to above descriptions with respect to the system for video retrieval based on optimized content fingerprint coding and delivery.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a mobile search-ready smart display system containing a smart display having a screen and at least one mobile device having a camera, the method comprising:
   extracting, by a hardware processor, a plurality of video fingerprints from an ongoing content displayed on the screen, the ongoing content having video frames corresponding to the video fingerprints;
   determining, by the hardware processor, one or more representative video fingerprints of the video frames from the plurality of video fingerprints;
   generating, by the hardware processor, one or more encoded representative video fingerprints through encoding the one or more representative video fingerprints into a pixel translucency change;
   delivering, by the hardware processor, the one or more encoded representative video fingerprints via a screen-camera communication; and
   performing, by the hardware processor, the encoding of the one or more representative video fingerprints and the delivering of the one or more encoded representative video fingerprints by solving a polynomial time dynamic problem to find a value indicating a video retrieval accuracy between an error resilience and a transmission time.

2. The mobile search-ready smart display method according to claim 1, further comprising:
   decoding, by the hardware processor, the one or more encoded representative video fingerprints to uncoded video fingerprints;
   searching, by the hardware processor, for a matching video having video frames corresponding to the uncoded video fingerprints in a content database; and
   returning, by the hardware processor, searching results to a user.

3. The mobile search-ready smart display method according to claim 1, further comprising:
   solving, by the hardware processor, the polynomial time dynamic problem using a Lagrange multiplier method.

4. The mobile search-ready smart display method according to claim 1, wherein:
   the pixel translucency change is an alpha value change.

5. The mobile search-ready smart display method according to claim 4, wherein:
   the alpha value change of each pixel is based on color distribution of the video frames and frame transition.

6. The mobile search-ready smart display method according to claim 1, wherein:
   the smart display is an online display or an offline display.

7. The mobile search-ready smart display method according to claim 1, wherein performing the encoding of the representative video fingerprints and the delivering of the encoded representative video fingerprints further includes:
   finding, by the hardware processor, a probability value that the fingerprint is able to be transmitted when given limited bits are used by the fingerprint.

8. The mobile search-ready smart display method according to claim 7, wherein:
   finding the probability value is represented by finding:

$$E(P) =$$

$$\max \begin{cases} \max\left[\prod_{k=1}^{K}(1-e)^{f_2+\Delta}\right], & \text{s.t. } F + \Delta \cdot K + \nabla \le B_{max} \\ \max\left\{E(P_{i-1}) \cdot \prod_{k=1}^{K}\left[(1-e)^{f_k+\Delta} + \right.\right. \\ \left.\left. (1-(1-e)^{f_k+\Delta}) \cdot M_k\right] + \right. & \text{s.t. } F + \Delta \cdot K + \nabla \le B_{max} - B_{i-1} \\ \left. [1-E(P_{i-1})] \cdot \prod_{k=1}^{K}(1-e)^{f_k+\Delta}\right\}, \end{cases}$$

wherein E (P) denotes the probability of a successful transmission of the fingerprint, $E(P_{i|i-1})$ denotes the probability of a successful transmission of a previous fingerprint, F denotes a fixed size of the fingerprint, K denotes a number of packets in the fingerprint, $\Delta$ denotes the packet overhead, and $\nabla$ denotes fingerprint checksum overhead, each fingerprint is divided into K packets and $f_k$ denotes original bits of each packet, k=1,2, . . . , K, $B_{max}$ denotes given limited bits used by the fingerprint, e denotes an expected bit error probability.

9. A non-transitory computer-readable medium having computer program for, when being executed by a hardware processor, performing a content retrieval method, the method comprising:
   extracting, by the hardware processor, a plurality of video fingerprints from an ongoing content displayed on the screen, the ongoing content having video frames corresponding to the video fingerprints;
   determining, by the hardware processor, one or more representative video fingerprints of the video frames from the plurality of video fingerprints;
   generating, by the hardware processor, one or more encoded representative video fingerprints through encoding the one or more representative video fingerprints into a pixel translucency change;
   delivering, by the hardware processor, the one or more encoded representative video fingerprints via a screen-camera communication; and
   performing, by the hardware processor, the encoding of the one or more representative video fingerprints and the delivering of the one or more encoded representative video fingerprints by solving a polynomial time dynamic problem to find a value indicating a video retrieval accuracy between an error resilience and a transmission time.

10. The non-transitory computer-readable medium according to claim 9, the method further comprising:
    decoding, by the hardware processor, the one or more encoded representative video fingerprints to uncoded video fingerprints;

searching, by the hardware processor, for a matching video having video frames corresponding to the uncoded video fingerprints in a content database; and returning, by the hardware processor, searching results to a user.

11. The non-transitory computer-readable medium according to claim 9, the method further comprising:

solving, by the hardware processor, the polynomial time dynamic problem using a Lagrange multiplier method.

12. The non-transitory computer-readable medium according to claim 9, wherein:

the pixel translucency change is an alpha value change.

13. The non-transitory computer-readable medium according to claim 12, wherein:

the alpha value change of each pixel is based on color distribution of the video frames and frame transition.

14. The non-transitory computer-readable medium according to claim 9, wherein:

the smart display is an online display or an offline display.

15. The non-transitory computer-readable medium according to claim 9, wherein performing the encoding of the representative video fingerprints and the delivering of the encoded representative video fingerprints further includes:

finding, by the hardware processor, a probability value that the fingerprint is able to be transmitted when given limited bits are used by the fingerprint.

16. The non-transitory computer-readable medium according to claim 15, wherein:

finding the probability value is represented by finding:

$$E(P) = \max \begin{cases} \max\left[\prod_{k=1}^{K}(1-e)^{f_2+\Delta}\right], & \text{s.t. } F+\Delta\cdot K+\nabla \le B_{max} \\ \max\left\{E(P_{i-1})\cdot\prod_{k=1}^{K}\left[(1-e)^{f_k+\Delta} + \right. \right. \\ \left. \left. (1-(1-e)^{f_k+\Delta})\cdot M_k\right] + \right. & \text{s.t. } F+\Delta\cdot K+\nabla \le B_{max}-B_{i-1} \\ \left. [1-E(P_{i-1})]\cdot\prod_{k=1}^{K}(1-e)^{f_k+\Delta}\right\}, & \end{cases}$$

wherein E(P) denotes the probability of a successful transmission of the fingerprint, $E(P_{i|i-1})$ denotes the probability of a successful transmission of a previous fingerprint, F denotes a fixed size of the fingerprint, K denotes a number of packets in the fingerprint, Δ denotes the packet overhead, and ∇ denotes fingerprint checksum overhead, each fingerprint is divided into K packets and $f_k$ denotes original bits of each packet, k=1,2, . . . , K, $B_{max}$ denotes given limited bits used by the fingerprint, e denotes an expected bit error probability.

17. A method for a mobile device having a camera, comprising:

receiving, by a hardware processor, one or more encoded representative video fingerprints of a video frame delivered via a screen-camera communication via a screen-camera communication;

decoding, by the hardware processor, the one or more encoded representative video fingerprints to uncoded video fingerprints;

searching, by the hardware processor, for a matching video having video frames corresponding to the uncoded video fingerprints in a content database; and returning, by the hardware processor, searching results to a user;

wherein:

the one or more encoded representative video fingerprints of the video frame are generated by encoding one or more representative video fingerprints of the video frame into a pixel translucency change, the one or more representative video fingerprints are selected from a plurality of video fingerprints extracted from an ongoing content displayed on a screen of a smart display, the encoding of the representative fingerprints and the delivering of the encoded representative video fingerprints are performed by solving a polynomial time dynamic problem to find a value indicating a video retrieval accuracy between an error resilience and a transmission time.

18. The method for a mobile device having a camera according to claim 17, further comprising:

solving, by the hardware processor, the polynomial time dynamic problem using a Lagrange multiplier method.

19. The method for a mobile device having a camera according to claim 17, wherein:

the encoding of the representative fingerprints and the delivering of the encoded representative video fingerprints are performed through finding a probability value that the fingerprint is able to be transmitted when given limited bits are used by the fingerprint.

20. The method for a mobile device having a camera according to claim 19, wherein:

finding the probability value is found through represented by finding:

$$E(P) = \max \begin{cases} \max\left[\prod_{k=1}^{K}(1-e)^{f_2+\Delta}\right], & \text{s.t. } F+\Delta\cdot K+\nabla \le B_{max} \\ \max\left\{E(P_{i-1})\cdot\prod_{k=1}^{K}\left[(1-e)^{f_k+\Delta} + \right. \right. \\ \left. \left. (1-(1-e)^{f_k+\Delta})\cdot M_k\right] + \right. & \text{s.t. } F+\Delta\cdot K+\nabla \le B_{max}-B_{i-1} \\ \left. [1-E(P_{i-1})]\cdot\prod_{k=1}^{K}(1-e)^{f_k+\Delta}\right\}, & \end{cases}$$

wherein E(P) denotes the probability of a successful transmission of the fingerprint, $E(P_{i|i-1})$ denotes the probability of a successful transmission of a previous fingerprint, F denotes a fixed size of the fingerprint, K denotes a number of packets in the fingerprint, Δ denotes the packet overhead, and ∇ denotes fingerprint checksum overhead, each fingerprint is divided into K packets and $f_k$ denotes original bits of each packet, k=1,2, . . . , K, $B_{max}$ denotes given limited bits used by the fingerprint, e denotes an expected bit error probability.

* * * * *